UNITED STATES PATENT OFFICE.

JEROME W. FRANK, OF NEW YORK, N. Y.

COATING PROCESS.

1,110,765.  Specification of Letters Patent.  Patented Sept. 15, 1914.

No Drawing.  Application filed February 27, 1912. Serial No. 680,242.

*To all whom it may concern:*

Be it known that I, JEROME W. FRANK, a citizen of the United States, residing at New York, in the county of New York and State of New York, have invented certain new and useful Improvements in Coating Processes, of which the following is a specification.

This invention relates to coating processes; and it comprises a process of coating calcareous surfaces, that is, surfaces containing or composed of lime, plaster, or gypsum, cement, mortar and other calcareous materials, wherein such a surface is given a first or priming coat with a composition comprising a resinous material free of saponifiable matter and is thereafter given a final or finishing coating; all as more fully hereinafter set forth and as claimed.

The painting and finishing of walls, blocks, bricks and shaped articles composed of, coated with, or containing calcareous materials, such as cement, lime, plaster of Paris, mortar, concrete, grouting, etc., offers a number of difficulties with the usual materials employed for painting and finishing since these latter are mostly attacked by lime and other alkalies to a greater or less extent. Taking cement concrete or lime mortar for example, the lime present (as well as other alkalies usually occurring together with the lime) attacks resin acids and fatty acids, as well as their glycerids (such as the linolein of linseed oil), forming lime soaps. On the other hand, this destroys the bond of the calcareous materials by the removal of lime, or the destruction of bonding compounds containing it, and on the other the formation of the lime soaps affects prejudicially the coating materials. It has been attempted to obviate this difficulty by a preliminary treatment of the surface or material by mineral acids, such as hydrochloric acid, or salts, such as sulfates of various bases, to remove the free lime; but this of course destroys the bond of the calcareous material on the surface, or as far as the action of the acid or salt extends, and makes such surface more or less friable. It has also been attempted to obviate it by the use of free fatty or resinous acids with the idea of forming lime soaps; but this also affects the bond of the surface while the lime soaps do not prove in this case desirable components of the coating, as they tend to oxidize and become friable and are hydrolytic.

I have found that for good and permanent results it is desirable to form the first or priming coatings, that is, the coating next to and in actual contact with the calcareous surface, of compositions which are free of saponifiable constituents; of compositions which are substantially indifferent to the action of lime or other alkalies and unaffected by moisture. With a priming coating of this character covering, protecting and shielding it from the lime and other alkaline ingredients of the calcareous materials, the final or main coating can be either of the same composition as the priming coating or of other materials which, in themselves, would be sensitive to lime and alkalies, since such coating does not directly contact with the calcareous materials, being separated, spaced from and united to the same by the described primer coat.

Many organic materials may be treated to secure coating compositions suitable for my purposes. As all resins, most crude rubbers and the like contain saponifiable substances, it is necessary that this treatment include reacting on the material with an alkali, with subsequent removal of the products formed by the action of the alkali. After such an alkali treatment, of course, the material is no longer affected by contact with the alkaline bodies of calcareous materials and surfaces. Substantially nothing is left to be affected. As the alkali, soda is the most convenient and economical. It may be used in the form of carbonate or as caustic soda, and may be directly contacted with the organic material, melted or in a pulverized state, with a subsequent washing to remove the soda soaps formed. Or the alkali may be used in solution in water, alcohol or other solvent. Potash or ammonia may be used but have no advantage over soda. Generally, with most organic materials such as gum and resins, it is the most convenient and advantageous to boil the comminuted gum or resin with a solution of caustic soda till the desired amount of saponification has been effected and then separate the watery solution or emulsion of soda soaps from the unchanged portions of gum or resin, and dry the washed unchanged portions of gum or resin. The dried unchanged portion is the material used in the present invention.

As stated, many organic materials used for coating purposes may be used within the present invention, it being only necessary that by appropriate treatment they shall have been practically completely freed of saponifiable ingredients. Dammar gum is particularly suitable. As this resin is imported, it may be said to contain about 70 per cent. unsaponifiable matter and about 30 per cent. of saponifiable matter. Upon boiling it up with aqueous soda, the latter portion may be readily removed. This treatment improves this gum not only for the present purposes, but for protective and decorative coatings generally. The treated gum or resin, substantially free of saponifiable matter, with petroleum solvents and the like gives compositions of about double the viscosity of those afforded by the untreated material, and of better quality in many other respects; including its applicability to calcareous surfaces. Other copals, including both hard and soft copals, as the African copals, kauri copal, South American copals, Indian copals, Manila copals, etc., may be treated in the same manner and with the same advantageous results as regards applicability to calcareous or other alkaline surfaces. Many other gums and resins may be also used, as for instance pontianak (or "ponty") resin, guayule resin, etc. Ordinary rosin, colophony, is substantially all saponifiable matter and is consequently not well adapted to the present purposes. Resinous rubbers and gutta perchas, such as pontianak, guayule, African rubbers, balata, gum chicle, gutta percha, etc., may also be used. Pontianak rubber as imported contains some portion of rubber and a larger portion of resins, some portion of the resin being saponifiable. The resins are often extracted by solvents and may be commercially obtained. In the present invention, either the crude pontianak rubber, or the resins which have been extracted therefrom, may be treated with boiling or hot caustic soda solution, or sodium carbonate solution to remove saponifiable bodies and the residue used in making compositions applicable in the present invention. If the crude rubber itself has been employed, the resulting coating composition will contain both rubber and unsaponifiable resin; if the extracted resin alone is used, the composition does not contain rubber. The same is of course true with regard to other crude rubbers and their resins. The use of a crude low grade resinous rubber freed of saponifiable ingredients is often particularly advantageous in the present invention. The modicum of rubber present in a composition made from acid-freed crude pontianak causes the composition to be much better. The acid-freed resins of pontianak by themselves give coatings which though not attacked by calcareous materials and not oxidizing, are somewhat friable and brittle.

In making a composition for the present purposes, after producing the body-giving ingredient or resin or gum free of saponifiable matter, it is better dissolved in a solvent or vehicle which is itself free of matters which are saponifiable or attackable by calcareous or alkaline materials such as lime. The various hydrocarbon solvents, such as the petroleum products may be employed. Turpentine, wood turpentine, pine oil, and the like may also be used. In many instances, it is better to treat them with alkali to remove saponifiable bodies. Ketone solvents, such as wood tar and pyroligneous acid distillates, acetone, etc., may also be used. The alcohols, as for instance denatured alcohol, wood spirit, fusel oil, etc., are also suitable in many instances. But for cheap solvents, well adapted to resist alkali, I regard the petroleum derivatives as best adapted.

In a typical embodiment of the present invention I may take 100 parts of dammar gum, reduced to a fine powder and heat the same with a solution of 20 parts caustic soda or 45 parts carbonate of soda in 200 parts of water. About 30 per cent. of the gum will go into solution. The turbid liquid produced is separated from the unsaponifiable resin and the latter washed till the wash water is no longer alkaline. The washed material is then dried, best by the passage of a current of heated air. After drying the material may be dissolved in, say, 180 parts of turpentine or benzin. The liquid composition thus produced may be used as a primer coat on walls having a concrete, plaster, grout or whitewashed face.

In another typical embodiment of the present invention, I may take 100 parts of kauri copal reduced to a fine powder and heat the same with a solution of 18 parts caustic soda or 120 parts of carbonate of soda in 200 parts of water. About 23 per cent. of the copal will go into solution. The turbid liquid produced is separated from the unsaponifiable resin and the latter washed until the wash water is no longer alkaline. The unsaponifiable material is then dried, best by a current of heated air, and may then be dissolved in the proportions of, say, 50 parts in 140 parts of denatured alcohol, or acetone. Or I may take 100 parts of Indian copal reduced to a fine powder and heat the same with a solution of 30 parts of caustic potash or 125 parts of carbonate of soda in 200 parts of water. About 17 per cent. of the copal will go into solution. The turbid liquid produced is separated from the unsaponifiable resin and the latter washed until the wash water is no longer alkaline. The unsaponifiable material is washed and dried. About 30 parts may be dissolved in 210 parts of wood turpentine or pine oil.

The composition obtained in any of these examples being free of matter attacked by alkali, does not react with the lime and injure the facing, neither is it itself injured thereby. After the primer coat is applied to the object to be treated and dried, a main coating of varnish or paint may be applied, of any desired composition. As the primer coat of inert material shields the main coat from the action of the lime, the composition of the main coat, so far as this matter is concerned, is not material. The main coat may be of the same material as the primer coat but any ordinary paint or varnish may be used.

In making a composition containing some rubber, under the present invention, I may take 100 parts of crude pontianak rubber or "gum" and treat the same in a heated state with 7 parts of caustic soda or 25 parts of carbonate of soda dissolved in 200 parts of water. After heating the two together, the soapy solution is drawn off as before. The separated mixture of rubber and non-saponifiable resin is thoroughly washed, and then dried, and is dissolved up in a suitable solvent to make a coating composition. For this purpose, coal tar naphtha, or any other suitable solvent may be used. A good solution is made by dissolving 50 parts of the product in 160 parts of the coal tar naphtha. Balata, gum chicle, crude guayule rubber, African rubber, etc., may be treated in the same way.

To make a primer coat of non-saponifiable rubber resin, the resin may first be extracted from balata, pontianak, African rubber, etc., with any suitable solvent, such as methyl acetate, acetone, or the like, and the rubber diverted for any suitable use. The extracted resin after removing the solvent is then treated by heating with caustic soda or carbonate of soda as before until all saponifiable matter is removed. The washed unsaponifiable material may be dried and dissolved in any suitble solvent.

The Indian copals make, when treated in the described manner, compositions particularly suitable for my purposes. Pontianak rubber freed of saponifiable matter but containing the unsaponifiable resins, is another particularly advantageous material for my purposes. Very good mixtures may be made of Indian copal and pontianak rubber, both treated as described, in varying proportions as, for instance, 40 parts of the unsaponifiable residue of Indian copal and 20 parts of the unsaponifiable residue of pontianak rubber. However, these proportions may be varied within wide limits.

The solutions of dammar gum or Indian copal or pontianak rubber or gum may, as stated, be used alone or in admixtures in varying proportions after each solution is prepared separately; or the extraction of the saponifiable matter may be done on mixed raw resin and raw rubber gum. As an example, I may take 50 parts dammar gum and 25 parts crude pontianak rubber or gum and heat the same with a solution of 15 parts caustic soda or 35 parts carbonate of soda in 200 parts of water. The turbid liquid produced may be removed as before, and the product washed and dried. After drying, 50 parts are dissolved in 150 parts of a suitable solvent.

Any desired amount of inert filler materials or pigments, such as terra alba, barytes white, lithopone, zinc white, satin white, pearl hardening, ocher, etc., may be used with or in the described fluid compositions of solvent and unsaponifiable material. These materials may be mixed with the resin or gum prior to or during solution in the solvent.

The present invention may also be usefully applied in the case of walls and other objects which have been washed or treated with sodium silicate (waterglass) or other alkaline materials. In removing paint from various surfaces with alkaline paint removers, such as a mixture of lime and carbonate of soda, the surface is frequently left somewhat alkaline even when thoroughly washed, and on such surfaces the use of the present invention is also advantageous.

What I claim is:—

1. The process of treating surfaces comprising calcareous or alkaline materials which comprises coating the same with a primer coating of a composition of organic coating materials free from saponifiable substances.

2. The process of treating surfaces comprising calcareous or alkaline materials which comprises coating the same with a primer coating of a composition of organic coating materials free from saponifiable substances and thereafter applying another coating.

3. The process of treating surfaces comprising calcareous or alkaline materials which comprises freeing an organic material of saponifiable substances, converting the residue into a fluent composition with a suitable solvent and applying the composition to such a surface as a primer coat.

4. The process of treating surfaces comprising calcareous or alkaline materials which comprises freeing an organic material of saponifiable substances, converting the residue into a fluent composition with a suitable solvent and applying the composition to such a surface as a primer coat and thereafter applying another coating of coating material.

5. The process of treating surfaces comprising calcareous or alkaline materials which comprises coating the same with a primer coating of an organic material free from saponifiable substances and thereafter applying another coating of a different coating material.

6. The process of treating surfaces comprising calcareous or alkaline materials which comprises coating the same with a primer coating of an organic material free from saponifiable substances and thereafter applying another coating of a coating material containing saponifiable bodies.

7. The process of treating surfaces comprising calcareous or alkaline materials which comprises coating the same with a primer coating of a composition comprising Indian copal free of saponifiable matter.

8. The process of treating surfaces comprising calcareous or alkaline materials which comprises coating the same with a primer coating of a composition comprising Indian copal free of saponifiable matter and also comprising pontianak resin free of saponifiable matter.

9. The process of treating surfaces comprising calcareous or alkaline materials which comprises coating the same with a primer coating of a composition comprising Indian copal free of saponifiable matter and also comprising pontianak resin and pontianak rubber, said resin and rubber being free of saponifiable matter.

In testimony whereof, I affix my signature in the presence of two subscribing witnesses.

JEROME W. FRANK.

Witnesses:
E. V. HOLTON,
JAMES L. WOLF.